United States Patent [19]
Yagasaki et al.

[11] Patent Number: 5,991,499
[45] Date of Patent: Nov. 23, 1999

[54] DATA RECORDING APPARATUS AND METHOD FOR PREVENTING ILLEGAL COPYING

[75] Inventors: Yoichi Yagasaki; Hideki Koyanagi; Katsumi Tahara; Yasushi Fujinami, all of Kanagawa, Japan

[73] Assignee: Sony Corporation, Tokyo, Japan

[21] Appl. No.: 08/697,794

[22] Filed: Aug. 30, 1996

[30] Foreign Application Priority Data

Sep. 1, 1995 [JP] Japan ................................. 7-225039

[51] Int. Cl.⁶ ............................................. H04N 5/91
[52] U.S. Cl. ............................. 386/94; 386/95; 386/102
[58] Field of Search ............................. 386/94, 95, 1, 386/102, 5; 360/60; 380/20–21, 4, 7; H04N 5/91

[56] References Cited

U.S. PATENT DOCUMENTS

| | | |
|---|---|---|
| 5,134,496 | 7/1992 | Schwab et al. ................... 358/335 |
| 5,182,680 | 1/1993 | Yamashita et al. . |
| 5,208,708 | 5/1993 | Mok . |
| 5,216,712 | 6/1993 | Shimoda et al. ...................... 380/4 |
| 5,315,448 | 5/1994 | Ryan .................................. 360/60 |
| 5,418,852 | 5/1995 | Itami et al. . |
| 5,579,120 | 11/1996 | Oguro ............................... 386/94 |
| 5,621,840 | 4/1997 | Kawamura et al. ............... 386/68 |
| 5,659,613 | 8/1997 | Copeland et al. ................. 380/3 |
| 5,673,357 | 9/1997 | Shima .............................. 386/94 |

FOREIGN PATENT DOCUMENTS

| | | |
|---|---|---|
| 0 581 227 | 2/1994 | European Pat. Off. . |
| 0 618 723 | 10/1994 | European Pat. Off. . |
| 0 667 720 | 8/1995 | European Pat. Off. . |

*Primary Examiner*—Thai Tran
*Assistant Examiner*—Vincent F. Boccio
*Attorney, Agent, or Firm*—Frommer Lawrence & Haug, LLP.; William S. Frommer

[57] ABSTRACT

Unauthorized copying of a digital video program is prevented by designating a first block and a second block of data in a bit stream encoded by a fixed length code. A portion of the first block is selected as key data and inserted into the second block to indicate that the digital video program is a copy and to prevent illegal copying.

85 Claims, 15 Drawing Sheets

Example Method of Selecting Block

Example Method of Selecting Block

Example Method of Selecting Block

FIG. 5A

DCT DC Component Size For Luminance

| VLC | DC Component Size For Luminance |
|---|---|
| 100 | 0 |
| 00 | 1 |
| 01 | 2 |
| 101 | 3 |
| 110 | 4 |
| 1110 | 5 |
| 11110 | 6 |
| 111110 | 7 |
| 1111110 | 8 |

FIG. 5B

DCT DC Component Size For Color Difference

| VLC | DC Component Size For Color Difference |
|---|---|
| 00 | 0 |
| 01 | 1 |
| 10 | 2 |
| 110 | 3 |
| 1110 | 4 |
| 11110 | 5 |
| 111110 | 6 |
| 1111110 | 7 |
| 11111110 | 8 |

| Example DCT DC Component Size of 3 | |
|---|---|
| DCT DC Differential | DCT zz(0) |
| 000 | −7 |
| 001 | −6 |
| 010 | −5 |
| 011 | −4 |
| 100 | 4 |
| 101 | 5 |
| 110 | 6 |
| 111 | 7 |

*FIG. 6*

| 1 | 2 | 3 | 4 | 5 | ... | n−1 | n |
|---|---|---|---|---|---|---|---|
| 1 | 0 | 1 | 1 | 0 | ---- | 1 | 0 |

*FIG. 7*

Example Methdd of Selecting Block

FIG. 18

Variable length codes for motion_code

| Variable length code | motion_code[r][s][t] |
|---|---|
| 0000 0011 001 | −16 |
| 0000 0011 011 | −15 |
| 0000 0011 101 | −14 |
| 0000 0011 111 | −13 |
| 0000 0100 001 | −12 |
| 0000 0100 011 | −11 |
| 0000 0100 11 | −10 |
| 0000 0101 01 | −9 |
| 0000 0101 11 | −8 |
| 0000 0111 | −7 |
| 0000 1001 | −6 |
| 0000 1011 | −5 |
| 0000 111 | −4 |
| 0001 | −3 |
| 0011 | −2 |
| 011 | −1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

DATA RECORDING APPARATUS AND METHOD FOR PREVENTING ILLEGAL COPYING

BACKGROUND OF THE INVENTION

The present invention relates to preventing data recorded on a recording medium from being illegally copied and, more particularly, to preventing illegal copying of the recorded data by encoding key data in legally reproduced copies.

The private ownership of video tape recorders has spread so extensively in recent years that copying of video programs has become commonplace. Video rental stores rent video tapes to consumers for home entertainment and some consumers, without authorization, copy the video programs recorded on the rental video tapes. This problem is compounded by professional copiers, or pirates, who illegally copy the video programs en masse to distribute the illegal copies for profit.

While measures have been taken to prevent the illegal copying of video programs from rental video tapes, the problem is not so severe because copied video programs have poor image quality. This is because illegally copied video programs are originally recorded as analog signals, which do not lend themselves to accurate copying. The image quality of such an analog signal after copying several times, i.e., after several generations, is unavoidably deteriorated. For this reason, the duplication of copies is limited and the problem of copying analog video programs is somewhat manageable.

However, with the recent introduction of digital video recorders which have the capability of high quality copying, the problem of illegal copying is severe. Digital video, unlike its analog predecessor, has the advantage of being reproduced with high image quality and can be copied a number of times without deterioration. Accordingly, the problem of illegal copying is much more severe in the case of digital video recording and the prevention thereof is quite important to the digital video industry.

Heretofore, proposals to prevent the illegal copying of digital video programs have proven insufficient to thwart illegal copying. For example, it has been proposed to record a flag onto legal copies of the digital video program in the flyback period, indicating to a digital video recorder that the digital video program is a copy and should not be copied illegally. Nevertheless, professional copiers have easily circumvented this anti-copying technique by constructing special digital circuits and software which ignore the flyback period and illegally copy the digital video program. Since the flyback period does not contain a significant part of the digital video program, the resulting illegal copies have sufficiently high image quality and may be duplicated a plurality of times. Thus, it is clear that a superior technique of preventing illegal copying is much needed in the digital video industry.

OBJECTS AND SUMMARY OF THE INVENTION

It is an object of the invention, therefore, to provide data recording that prevents illegal copying.

It is a further object of the invention to provide data recording that prevents illegal copying by designating a first block of data in a bit stream which contains key data.

It is a further object of the invention to provide data recording that prevents illegal copying by inserting the key data into a second block of data in the bit stream.

It is an even further object of the invention to provide data recording that prevents illegal copying by indicating the key data is in the second block.

In accordance with the above objectives the present invention prevents illegal copying of a digital video program by designating a first block and a second block of data in a bit stream encoded by a fixed length code. A portion of the first block is selected as key data and is inserted into the second block to indicate that the digital video program is a copy and to prevent illegal copying.

BRIEF DESCRIPTION OF THE DRAWINGS

The above objects, features and advantages of the present invention will become apparent from the following detailed description of illustrative embodiments which is to be considered in connection with the accompanying drawings, in which:

FIG. 5A depicts a table for a variable length coding technique for the DC coefficient in a luminance DCT block;

FIG. 5B depicts a table of variable length coding the DC coefficient in a DCT block of a color difference component;

FIG. 6 depicts a table of fixed length encoding of a DC differential of the DCT blocks;

FIG. 7 depicts the key data for preventing illegal copying according to the present invention;

FIG. 18 is a table of variable length codes and motion codes according to the present invention.

DETAILED DESCRIPTION OF THE PREFERRED EMBODIMENTS

Figure 1:
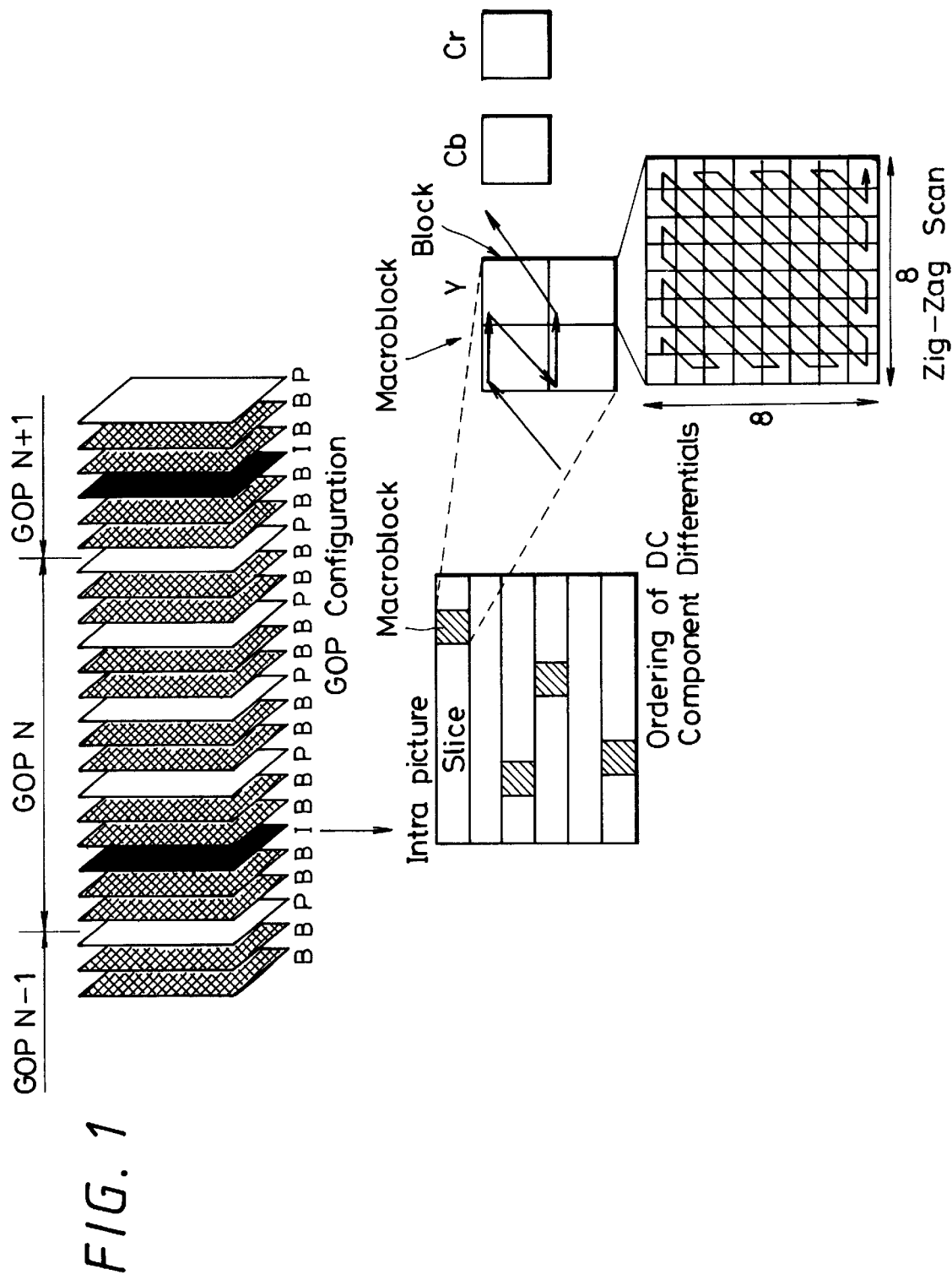
FIG. 1 illustrates encoding of groups of pictures (GOP)

Referring now to the drawings, wherein like reference numerals designate identical or corresponding parts throughout the several views, the encoding process of the groups of pictures (GOPN) to which the present invention relates will be described with reference to FIG. 1. FIG. 1 shows an MPEG (Moving Picture Experts Group) encoding process for encoding digital video programs which are composed of a series of picture frames to be displayed sequentially on a video monitor. According to the MPEG standard, each picture frame in the series is divided into image pictures making up a group of pictures (GOP). That is, one group of pictures includes a series of image pictures of the moving picture.

MPEG prescribes that the image pictures making up the groups of pictures (GOPN) be encoded as an I-picture, a P-picture or a B-picture. The I-picture is encoded using only data within that image picture and is, therefore, called an intra-picture frame (or an intra-picture field). The P-pictures, on the other hand, are encoded using data from a preceding image picture. Similarly, the B-pictures are encoded using both preceding and succeeding image pictures. The encoding technique for the P-pictures and B-pictures is known as predictive encoding and these encoded image pictures are called inter-picture frames (or fields) because they are encoded by using data in other image pictures. These intra and inter-picture frames (or fields) (I, P, B) are, then, compressed according to a discrete cosine transformation (DCT) process discussed below.

FIG. 1 depicts DCT compressing an intra-picture (I-picture) wherein the present invention preferably inserts the key data into the DCT compressed intra-picture (I-picture) of FIG. 1. Since the intra-pictures are not encoded with reference to other image pictures, inserting key data into the intra-pictures does not disturb other image pictures. Otherwise, inserting the key data into inter-pictures (P-pictures or B-pictures) disturbs the encoding arrangement of other image pictures and the encoded inter-pictures would not be decoded accurately. In addition, the first frame in an encoded group of pictures is an I-picture frame and determining the key data from this frame, therefore, will cause the illegal copying of the corresponding moving picture to be cut off immediately.

According to FIG. 1, an intra-picture (I-picture) to be encoded with key data is divided into macro blocks, each macro block being further subdivided into four DCT blocks (for simplicity, only four DCT blocks are shown). It will be noticed that each image picture actually comprises two fields, a luminance (Y) field and a color difference (Cb, Cr) field. These fields contain luminance (Y) data and color difference (Cb, Cr) data, proportioned in each field according to a 4:2:2 (Y:Cb:Cr) ratio. That is, the luminance (Y) field has four pixels of data for every one pixel of (Cb) field data and one pixel of (Cr) field data in the color difference field. Accordingly, the luminance (Y) macro blocks shown in FIG. 1 include four DCT blocks, while the color difference (Cb, Cr) macro blocks each include a single DCT block. The DCT blocks each preferably comprises 64 pixels arranged as shown in FIG. 1 in an 8×8 matrix.

According to the DCT process, these pixels are orthogonally transformed by DCT compression from a time-based signal into a frequency-based signal having DCT coefficients corresponding to the signal power of the 64 pixels at different frequencies. These DCT coefficients are arranged in a DCT block in ascending order of frequency shown by the zig-zag line beginning with a zero-frequency (DC) component in the upper left-hand corner and ending with the highest frequency DCT component in the lower right hand corner.

MPEG further prescribes that each DCT block be quantized in the order shown by the zig-zag line. According to the MPEG standard, the DCT coefficients are quantized using an average quantization value determined from a difference between the DC components of the DCT blocks. The order of determining the difference between the DC components is shown in FIG. 1 as beginning with the upper left-hand block, then proceeding to the upper-right hand block, followed by the lower left-hand block, and ending with the lower right-hand block. Following this order of determining the difference between the DC components, the differences between each of the DC components in the DCT blocks is determined and quantization of the DCT components is performed based on these differences.

Figure 2:
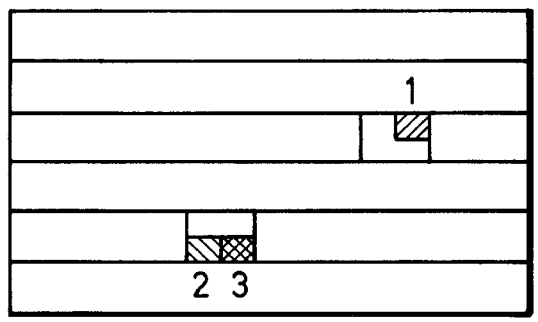
FIG. 2 depicts three DCT blocks in a picture frame of the GOP shown in FIG. 1 for preventing illegal copying according to the present invention.

The present invention inserts key data into the DCT blocks of an intra-picture frame or field (I-picture) to prevent illegal copying. As shown in FIG. 2, for example, three DCT blocks (1, 2, 3) are employed for this purpose. The first block (1) is selected from the DCT blocks encoded by the above process and the data within this first block (1) is selected as the key data. The present invention changes the data in the second block (2) to match the selected key data in the first block (1) to indicate that the corresponding video program is a copy and should not be illegally copied. The third block contains correction data which corrects an anomaly caused during the compression of the DCT blocks arising from the insertion of the key data into the second block (2).

The present invention selects a DCT block to be the first block (1) and the data in the first block is selected as the key data. It will be appreciated that the key data in the first block (1) is the original image data and, therefore, the encoded moving picture is not disturbed up to this point. The present invention sets the image data in the second block (2) to match the key data determined by the first block (1). That is, the difference in the image data between the first and second blocks (1, 2) is removed. Problematically, the DC component will be disturbed by removing this difference from the second block (2). The present invention corrects this problem by inserting correction data representative of the difference between the first and second blocks (1, 2) into the third block (3). When the DCT blocks are encoded, the disturbance caused by the change in the second block (2) is corrected by the third block (3), which contains the difference between the first and second blocks. In this manner, correction data in the third block (3) corrects the anomaly caused by the key data in the second block (2).

Figure 3:
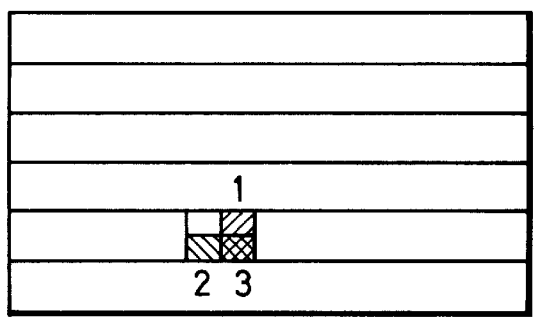
FIG. 3 depicts another selection of the three DCT blocks for preventing illegal copying according to the present invention.

The present invention arranges the three blocks in the order of DCT processing to ensure that the third block (3) is processed after the second block (2) by canceling the anomaly caused by the change in the second block (2). Preferably, the third block immediately follows, i.e., is adjacent to, the second block as shown in FIGS. 2 and 3 so that the disturbance is corrected immediately after the second block (2) is encoded.

The key data of the first block (1) is preferably selected from the DC differential so that the insertion of the key data may be performed during the calculation of the DC differential. By selecting the three blocks (1, 2, 3) to be adjacent each other as shown in FIG. 3, these blocks are in the sequential order of DC component processing shown in FIG. 1. With this DC component ordering, the data in the second block (2) is set to the key data immediately after the first block (1) and the anomaly caused by the second block (2) is canceled by the third block (3) immediately thereafter. As explained with reference to FIG. 1, the order of DC component processing begins with the upper left-hand DCT block and ends with the lower right-hand DCT block.

Figure 4:
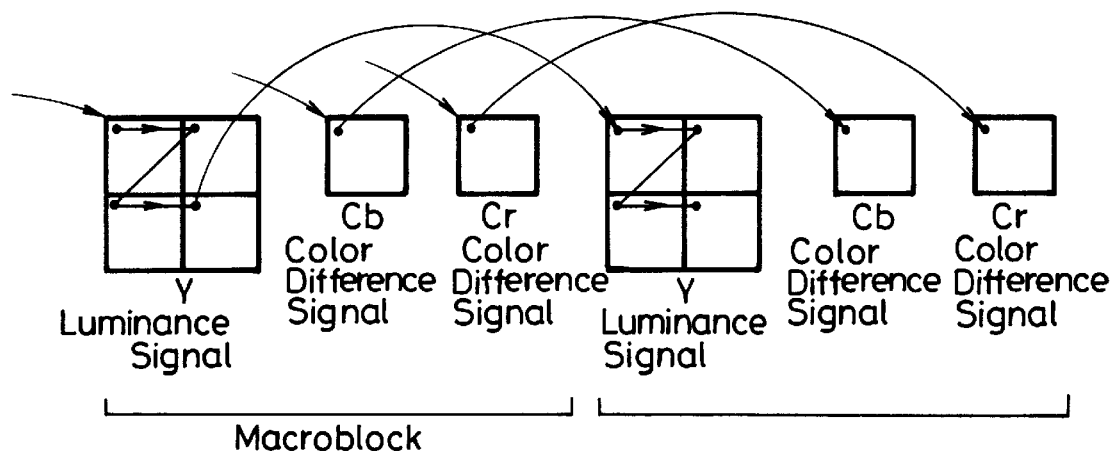
FIG. 4 depicts an order of encoding DC coefficients of DCT blocks of FIG. 1.

The order of processing the DC components has been described with reference to a macro block of luminance (Y)

signals. For the color difference signals which have a single DCT block in each macro block (Cb, Cr), the order of DC component processing follows the sequential order of the color difference signal DCT blocks shown in FIG. 4. In the present invention it is preferred to reserve the luminance (Y) signal macro blocks as the key data, but in the alternative, the color difference (Cb, Cr) macro blocks may be reserved for the key data in a similar manner.

The difference value of the DC component is represented by both the size of the DC component and actual value (DC differential) corresponding to the size of the DC component. The size of the DC component is represented by a variable-length code (VLC), and the DC differential is represented by a fixed-length code (FLC) as defined by the MPEG format. An example of the size of the DC component for the luminance signal (Y) is shown in FIG. 5A and the size of the color differences signals (CB, CR) is shown in FIG. 5B. It will be noted that the DC component, i.e., the size, of both the luminance and color difference signals is represented by the variable-length codes in these figures. By contrast, the DC differential is shown in FIG. 6, wherein the DC differential for the DC component having the size of three bits is represented by the fixed-length codes. In this example, where the DC component size is 3 and the actual value is –6, the difference value is given by the fixed-length code 101001, the prefix 101 indicating the size of the DC component and the suffix 001 indicating the actual value of –6.

An advantage of selecting the key data from the DC differential of the DC component is that this data is encoded using a fixed length code as shown in FIG. 6 which is uniform in length for all DCT blocks. The least significant bit of the DC differential in the first block is preferably selected as the key data in order to least disturb the DCT compression. Thus, the present invention sets a corresponding least significant bit of the DC differential in the second block to this value. As shown in FIG. 6, for example, a DC differential of three bits of the second block has its least significant bit set. When the least significant bit of the DC differential having the value of "000" in FIG. 6 is set to "1", for example, the DC differential for the second block is converted into "001" as shown by the arrows. It will be appreciated that the least significant bit of the second block results in a value change of one and, therefore, has a minimal impact on the moving picture. This impact is even further minimized when it is considered that the third block will immediately thereafter cancel the anomaly created by the second block charge.

According to this embodiment, the LSB of the DC differential of the second block is set to the same value as the LSB of the DC differential of the first block. For example, when the DC differential of the first block is 010 and the DC differential of the second block is 101, the LSB of the DC differential of the second block is rewritten to zero to make the DC differential 100. As another example, when the DC differential of the first block is 001 and the DC differential of the second block is 010, the LSB of the DC differential of the second block is rewritten to one in order to make the DC differential 011.

Thus, according to this embodiment, the DC differential of the second block is rewritten as shown by the arrows in FIG. 6. When the value of the DC differential is 001 and the LSB is rewritten to zero, for example, the DC differential value is rewritten as 000 but not as 010. As another example, when the value of the DC differential is 010, and the LSB of this value is changed to "1", the DC differential is rewritten as 011. As yet another example, when the value of the DC differential is 011 and the LSB is changed, the value is rewritten as 010. In this manner, only the LSB is rewritten. It will be appreciated that, when the LSB of the first and second blocks are the same, the LSB of the second block does not need to be changed.

It will be noted that, when the LSB of the DC differential of the second block (the values in the left column in FIG. 6) is rewritten in this manner, the actual value of the DCT coefficient (the values in the right column in FIG. 6) is incremented or decremented by one. If left uncorrected, this increment or decrement by one of the DCT coefficient would cause a slight disturbance in the reproduced image. The third block corrects this slight disturbance by changing its DC differential value in such a manner as to absorb the increment or decrement of the actual value of the DCT coefficient.

More specifically, when the LSB of the DC differential of the second block is rewritten from zero to one, the actual value of the DCT coefficient is incremented by one. To absorb this increment, the DC differential of the third block is rewritten in such a manner that it decrements the DCT coefficient by one. On the other hand, in the case where the LSB of the DC differential of the second block is rewritten from one to zero, the value of the DCT coefficient is decremented by one. In this situation, the DC differential of the third block absorbs this decrement by being rewritten in such manner that the actual value of the DCT coefficient is incremented by one.

Assume, for example, that 010 of the DC differential of the second block is rewritten as 011 as shown in FIG. 6. Thus, the actual value of the DCT coefficient is incremented by one, that is from –5 to –4. If the DC differential of the third block is 110, for example, the present invention rewrites the DC differential of the third block to 101. By doing so, the DC differential of the third block causes the DCT coefficient to be decremented by one, that is, from 6 to 5. As another example, in the case where the DC differential of the second block is rewritten from 011 to 010, the actual value of the DCT coefficient is decremented by one, that is, from –4 to –5. In this case, the DC differential of the third block which may be set to 110, for example, is rewritten as 111 in order to increment the actual value of the DCT coefficient by one, that is, from 6 to 7. In this manner, the third block absorbs the increment or decrement of the actual value of the DCT coefficient.

The present invention further provides setting the key data of a plurality of macro blocks. To that end, a string of (n) key data bits derived from the least significant bit of the DC differential in a plurality of first blocks is inserted into the least significant bits of respective second blocks. With this arrangement, it would be virtually impossible for a professional copier to determine all of the second blocks and remove the key data in order to illegally copy the corresponding moving picture. Despite the multiplicity of the key data blocks, these numerous blocks are quickly and efficiently decoded because the key data blocks are arranged in the known order of DC component processing.

Figure 8:
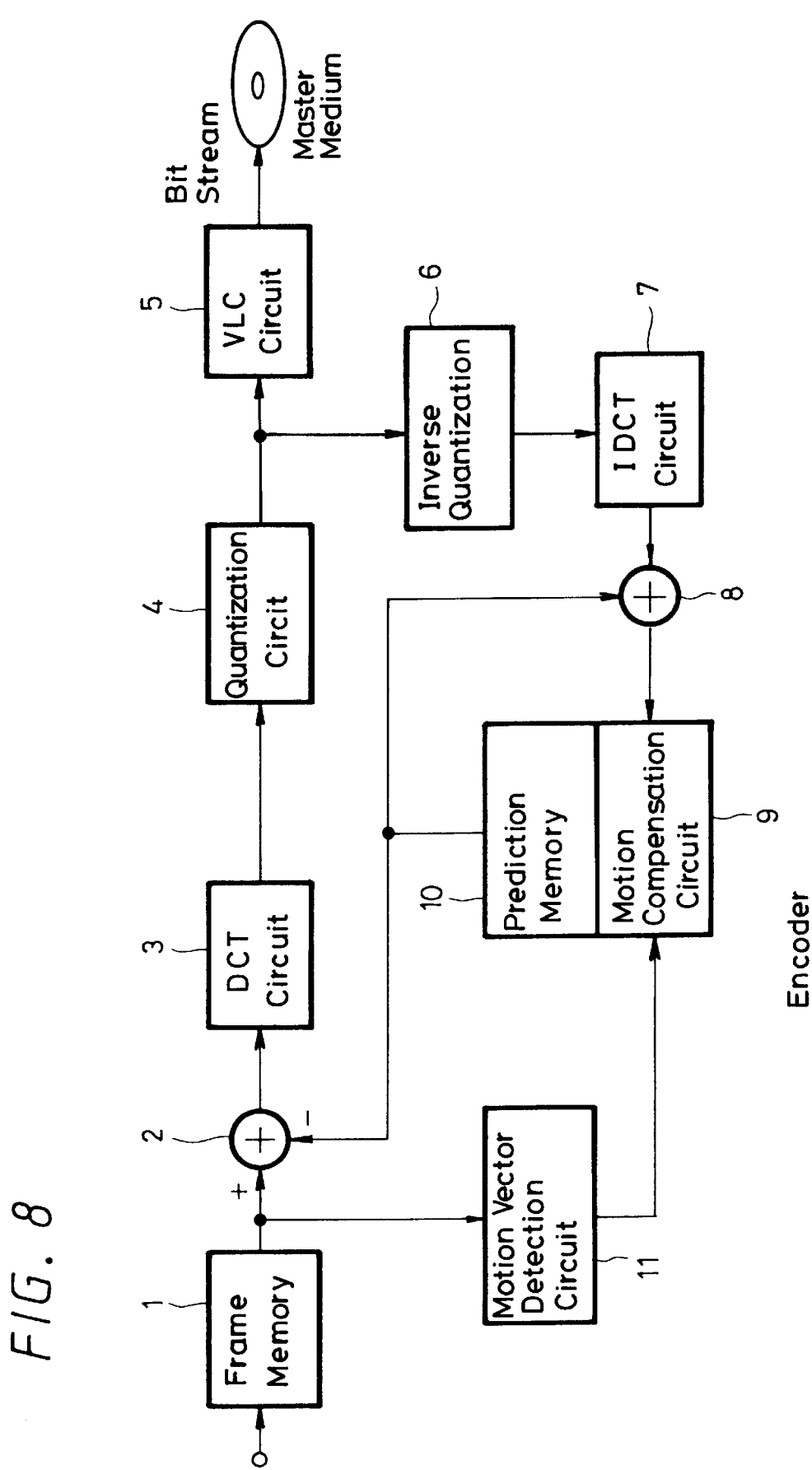
FIG. 8 is a block diagram of an encoder according to the present invention.

An encoder that encodes the moving picture from the original source into a bit stream to be recorded to a master disk or a master tape according to the present invention is shown in FIG. 8. A current picture frame of the moving picture is stored in a frame memory 1 and a motion prediction image stored in a prediction memory 10 is subtracted therefrom by a subtractor 2. The subtracted current picture frame is, then, DCT processed by DCT circuit 3, quantized by quantization circuit 4 and compressed by variable length coding (VLC) circuit 5 into a bit stream to be recorded to a master disk. The motion prediction image is generated in the motion compensation circuit by predicting the current frame from a previous frame motion vector detected by motion vector detection circuit 11 and a reconstructed version of the previous frame. The reconstructed version of the previous frame is generated by adder 8 that adds the previous motion prediction image to the previous image decoded by inverse quantization circuit 6 and inverse discrete cosine transformation (IDCT) circuit 7.

An explanation of the encoder will be given by example of its operation beginning at a time when a current frame is stored in frame memory 1. At this time, the motion prediction image is already stored in prediction memory 10 generated from the previous frame. This motion prediction image is a prediction of the current frame based on the motion vector of the previous frame detected by motion vector detection circuit 11 and the reconstructed version of the previous frame. The motion prediction image of the current frame represents the image decoded by a decoder. By subtracting this representative decoded image from the current frame, subtractor 2 generates the difference in data between the current motion vector and the encoded current frame. This difference data of the current frame is encoded and transmitted to the decoder to be decoded and employed to reconstruct the current frame.

The difference data, which is much smaller in data size than the unsubtracted current frame, is now ready to be compressed. The DCT circuit 3 transforms the data at the output of subtractor 2 by an orthogonal transform into the blocks of DCT coefficients (DCT [u], [v]). These DCT coefficients are quantized by quantization circuit 4 into corresponding quantization coefficients (QF [u], [v]) and compressed by the variable length encoding circuit 5. The resulting compressed bit stream is recorded onto a master medium 12 such as a magnetic tape or a high-density disk.

Figure 16:
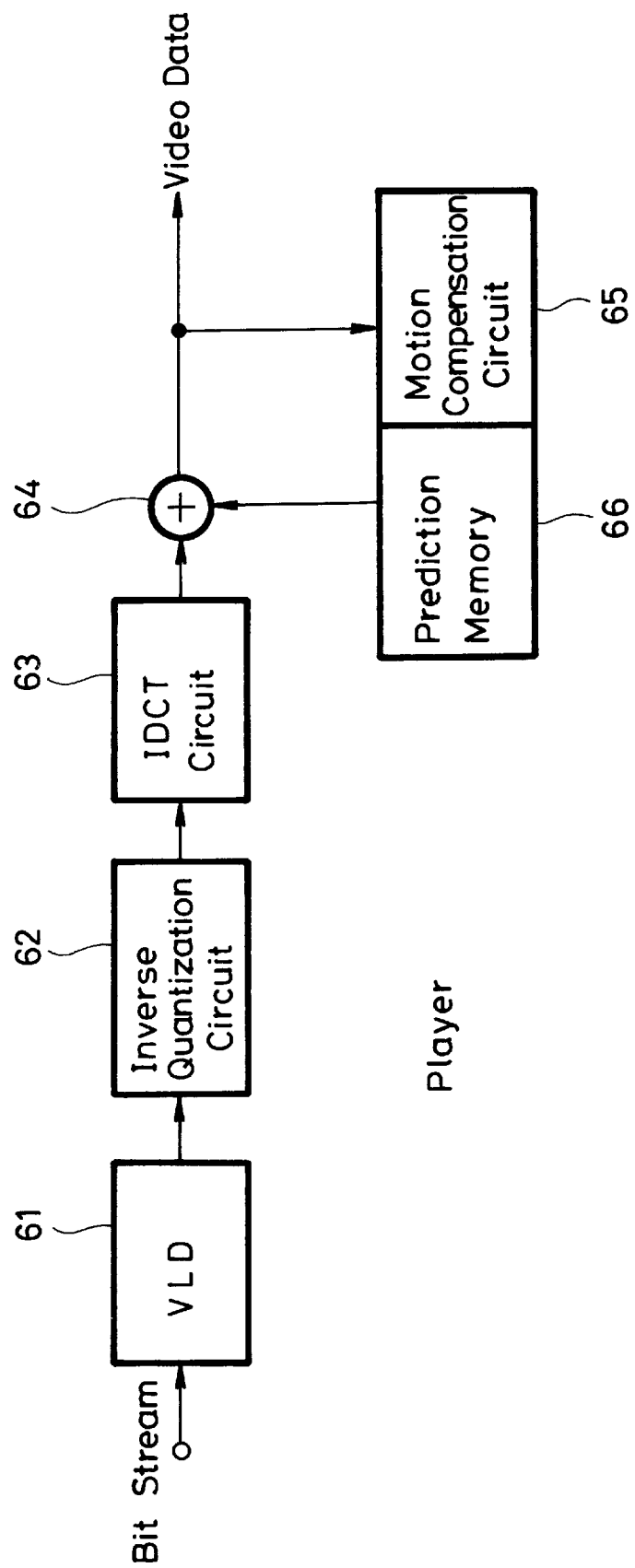
FIG. 16 is a block diagram of a video player according to the present invention.

It will be appreciated that inverse quantization circuit 6 and IDCT circuit 7 are employed to simulate the decoder at the decoding side (FIG. 16). The decoded data includes the errors in the encoded data inadvertently generated by DCT circuit 3 and quantization circuit 4. These errors are added along with the decoded data to the motion prediction image to reconstruct the data as it was immediately before encoding. This reconstructed data is employed to generate the motion prediction image of the current frame which is subtracted from the current frame by subtractor 2. In this manner, the errors generated by encoding are subtracted from the current frame, thereby resulting in a more accurate encoding process.

The motion compensation circuit generates the motion prediction image by comparing this reconstructed image of the previous frame to the motion vector of the previous frame. The motion vector indicates the motion of the previous frame. From this motion vector, the motion compensation circuit makes a prediction of the arrangement of images in the current frame. This prediction is stored in the prediction memory 10 and subtracted from the actual current frame by the subtractor as described.

Figure 9:
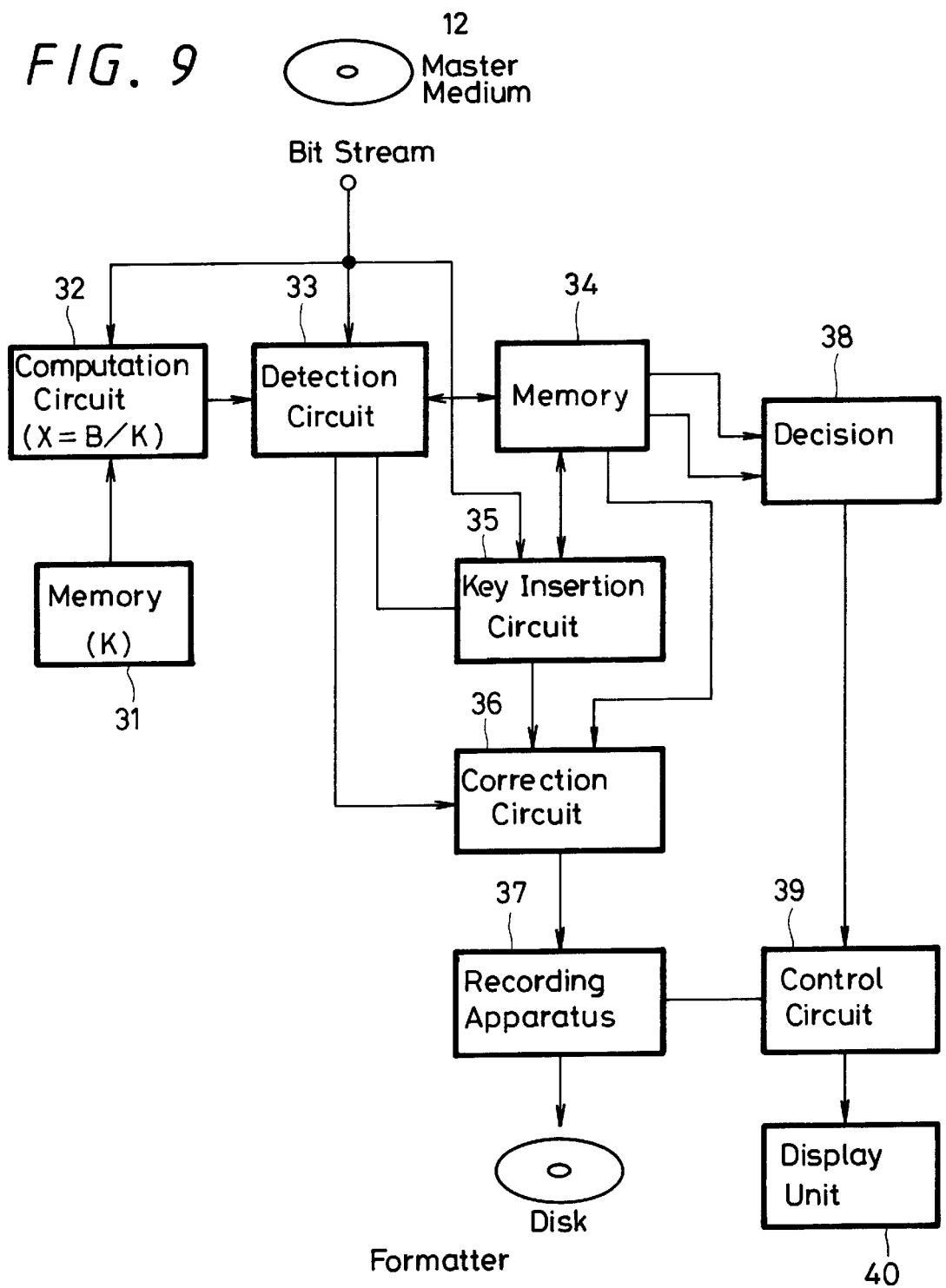
FIG. 9 is a block diagram of a formatter for encoding the key data into the DCT blocks to prevent illegal copying according to the present invention.

The encoded bits are recorded to a master medium and the master medium is employed by legal copiers to create legal copies. Without more, the illegal copiers would be able to illegally copy such copies from the illegal master disk. To prevent this illegal copying, the present invention provides a formatter as shown in FIG. 9 that inserts the key data into the encoded bit stream. It will be appreciated that, as an alternative, the formatter can format the encoded bit stream output directly from the encoder without first being recorded to the legal master medium.

Thus, the formatter produces a large quantity of disks (ROM disks) from the legal master medium 12. As will be explained with reference to FIG. 9, the formatter detects when the master medium is a copy, that is, an illegal reproduction of the master medium. In this latter case, the formatter prevents illegal copying and a large quantity of disks can not be produced.

A computation circuit 32 reads the bit stream up to a predetermined position and computes a position (X) of the first block that will determine the key data by, for example, use of the equation (X=B/K), wherein (B) is data extracted from the bit stream and (K) is a predetermined key stored in memory 31. A detection circuit 33 detects the first block at position (X) in the encoded bit stream and causes memory 34 to extract the key data therefrom. A key insertion circuit 35 inserts the extracted key data into the second block and a correction circuit 36 forms the third block of correction data to correct the anomaly of the inserted key data in the second block. A decision circuit 38 determines whether the encoded bit stream is reproduced from a legal master disk or from a copied version of the master disk such as the disk offered for sale and the illegal master disk and causes the control circuit to allow the encoded bit stream to be recorded by recording apparatus 37 only in the former situation. Otherwise, the encoded bit stream is judged as a stream from the illegal master disk and the recording apparatus is prevented from illegally copying the encoded bit stream. The formatter displays the decision of the decision circuit to an operator, via display unit 40.

Figure 10:
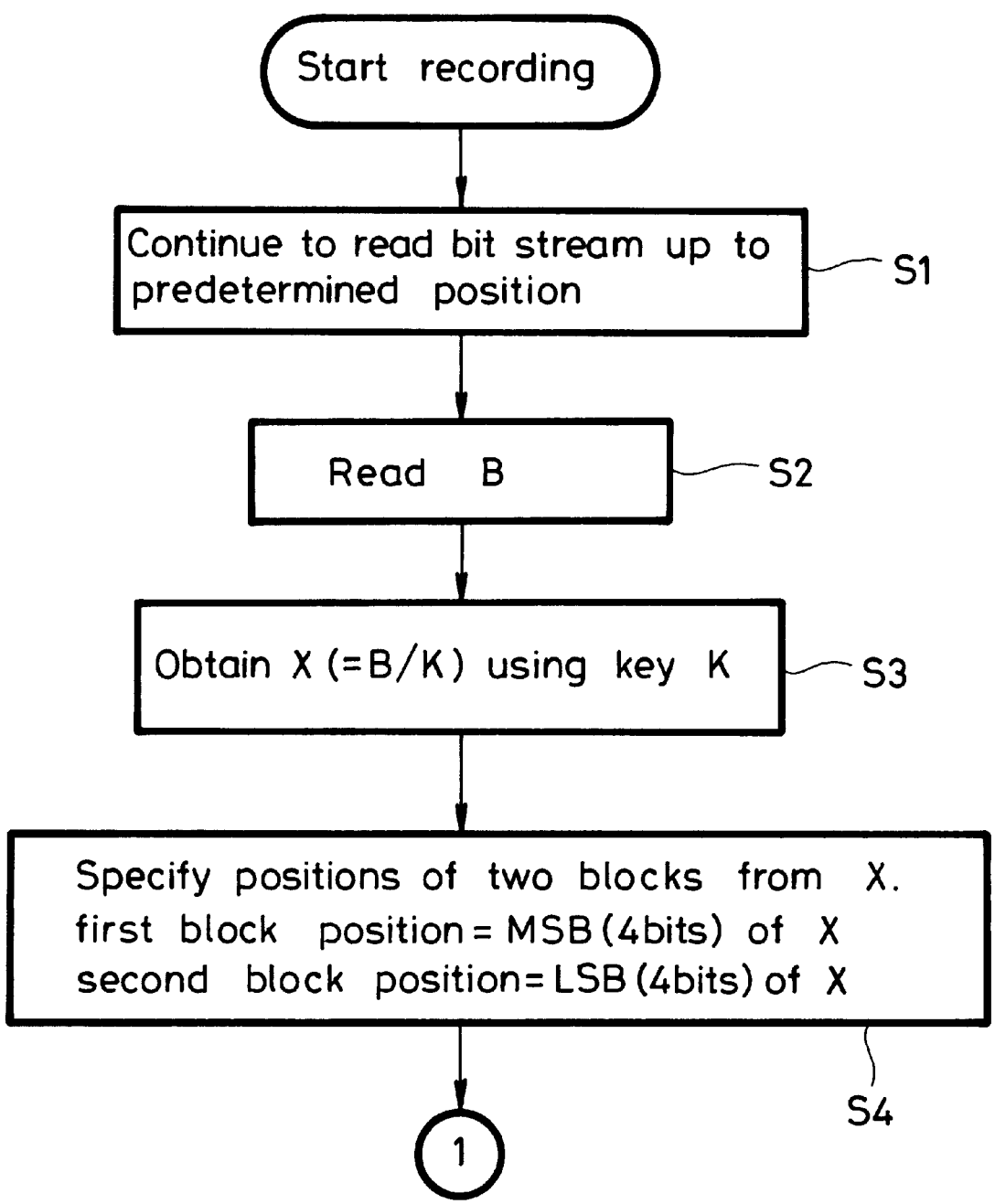
FIG. 10 is a flow chart for explaining the operation of the formatter shown in FIG. 9.

The operation of the formatter in FIG. 9 will be explained with reference to the flow charts of FIGS. 10–12. The formatter starts a recording operation by causing computation circuit 32 to continuously read the encoded bit stream in step S1. According to the present invention, the key data is inserted into an I-picture frame which is the first frame in each group of pictures and, therefore, the first frame in the moving picture. Thus, the first, I-picture frame bits are read by the computation circuit and the data (B) is extracted in step S2 from, for example, a sequence of the bits in the stream corresponding to header information. The computation circuit, then, computes the position (X) of the first block in step S3 by use of, for example, the equation (X=B/K), wherein the value (K) is a predetermined value stored in memory 31.

It will be appreciated that the equation (X=B/K) provides additional protection from illegal copying. The value (K) stored in memory 31 may be derived, for example, from a password input by the operator or other password generating means. The value (B) may be derived from a secret area of the bit stream. Together, the values (K) and (B) act as a double key, which is difficult for an illegal copier to decrypt.

In step S4, the computation circuit specifies the positions of the first and second blocks from position (X). For example, where (X) is a byte of data, the computation circuit may specify the four most significant bits (MSB) of byte (X) as the position for the first block and the following four least significant bits (LSB) of byte (X) as the position for the second block. In the alternative, the six most significant bits (MSB) of (X) represent the position for the macroblock and the following two least significant bits (LSB) of byte (X) represent the position for the first block and the second block immediately follows the first block. Indeed, the number of bits comprising the position of the first block may be selected variably in order to further impede illegal copiers from determining the position of the first block. The computation circuit 32 generates the signal showing the position of the first and second blocks.

Figure 11:
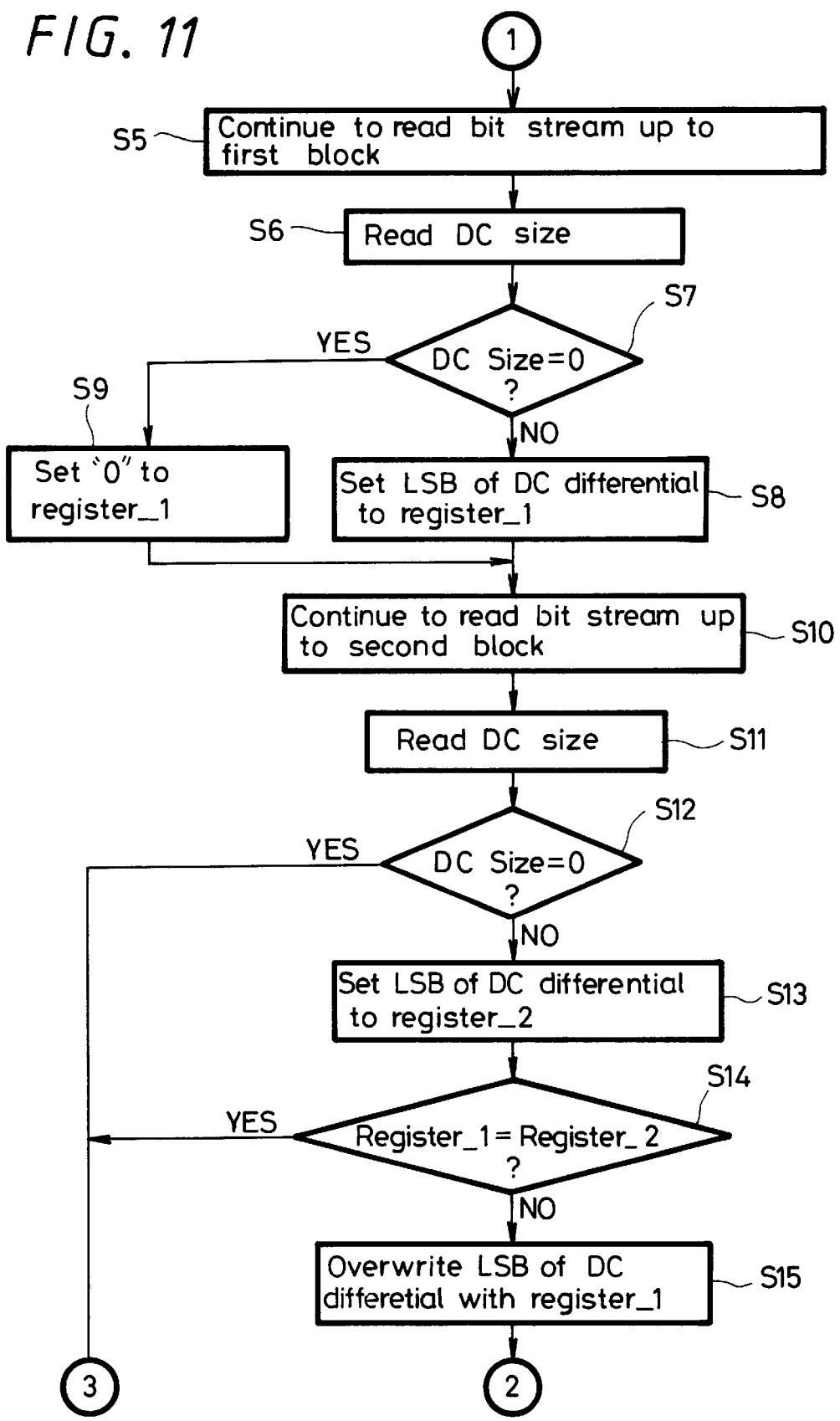
FIG. 11 is a flow chart continued from FIG. 10.
Figure 12:
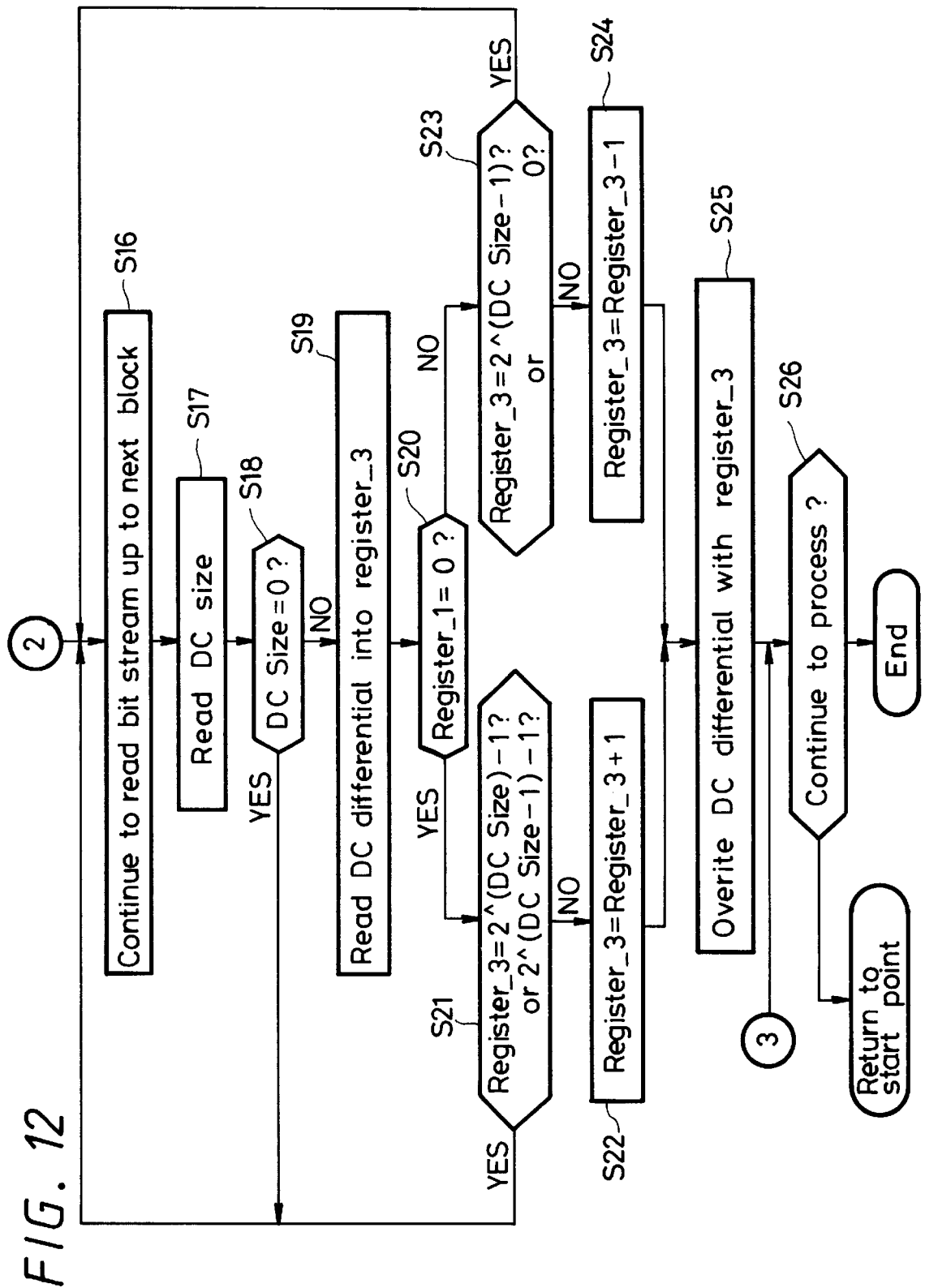
FIG. 12 is a flow chart continued from FIG. 11.

Now referring to the portion of the flow chart depicted in FIG. 11, the operation of the formatter proceeds to step S5 wherein detection circuit 33 reads the bit stream and detects when the position of the first block in the bit stream as determined in the previous step is reached. The present invention selects the least significant bit of the DC differential in the first block as the key data which is set in the second block to prevent the illegal copy. To detect the DC differential, the detection circuit detects the DC size for the block in inquiry S7. If the DC size is not zero, the operation of formatter proceeds to step 8 and a register (register_1) in memory 34 is set to the least significant bit of the DC differential as the key data by the detection circuit 33. Otherwise, the DC size is zero, and the formatter proceeds to step S8 where a register (register_1) is set to "0" by the detection circuit 33.

The operation of formatter, then, proceeds to step S10, wherein reading is continued by the detection circuit 33 and detection circuit 33 detects the second block in the read bit stream. Similar to step S6, the detection circuit in step S11 reads the DC size for the current block. If the detection circuit in inquiry S12 detects that the DC size of the block is zero, therefore, the logic is advanced to step S26 (FIG. 12). Otherwise, the DC size of the block is not zero, the operation of the formatter advances to step S13 wherein the least significant bit of the DC differential of the current block is sent to a register (register_2) in memory 34 and is set in the register (register_2).

In Inquiry S14, the detection circuit 33 determines whether the values in register_1 and register_2 are equal and, if so, the least significant bit of the DC differential in the second block is considered to have been substantially changed already. In this situation, there is no need to write the LSB of the DC differential of the first block into the LSB of the DC differential of the second block and the logic bypasses the writing step of S15 to step S26. On the other hand, where the values in the registers are not judged equal it is deemed that the LSB of the DC differential of the second block was not yet set to the LSB of the DC differential of the first block. In this latter situation, the logic advances to step S15 where the detection circuit 33 generates the detection signal to the key insertion circuit 35 and key insertion circuit 35 reads out the LSB of the DC differential of the first block from the register_1 and overwrites the LSB of the DC differential of the second block with the LSB of the first block to indicate that the encoded bit stream is a copy and should not be illegally copied.

As a result of the foregoing overwrite operation setting the LSB of the second block, the original bit stream deviates by only one from the decoding image in the case where the DC component of each block is quantized in eight bits, by 0.5 in the case where the DC component of each block is quantized in 9 bits, by 0.25 in the case where the DC component of each block is quantized in 10 bits, by 0.125 in the case where the DC component of each block is quantized in 11 bits. Next, a correction process is performed for suppressing a mismatch attributable to the setting of the LSB of the second block.

The processing for the third block will be explained with reference to steps S16 to S25. While the third block may be positioned at any point in the bit stream, it is preferred that it immediately follows the second block. Thus, the detection circuit continues to read the encoded bit stream after the second block and detects the third block thereafter in step S16. The detection circuit in step S17 reads the DC size of the current block and determines in inquiry S18 whether that DC size is zero. As in inquiries S7 and S12, when the DC size detected is not zero, the operation of the formatter proceeds to step S19. Otherwise, if the DC size is zero, the operation of the formatter proceeds to step S16. Unlike the previous inquiries, in inquiry S19 the detection circuit 33 writes the entire DC differential, not only the LSB thereof, of the third block into a third register (register_3) of memory 34 when the DC size is not zero. As an example, the DC differential may be represented by a fixed length code of three bits as shown in FIG. 6.

Figure 13:
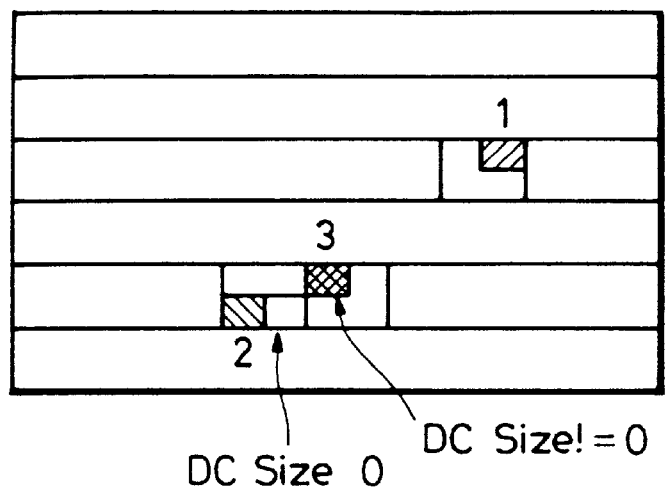
FIG. 13 depicts the selection of the three DCT blocks in explanation of step S18 of the flow chart shown in FIG. 12.

At inquiry S20, the detection circuit determines whether the value stored in register 1 (register_1) is "0" indicating that the second block was rewritten from a "1" to "0" and advances to inquiry S21. Otherwise, the detection circuit decides that the second block was written from a "0" to "1" and advances to inquiry S23. In inquiries S21 and S23, the detection circuit 33 determines whether the third block is proper for a correction block. If the third block is deemed inappropriate, the next block in the bit stream is chosen to be the third block. This is shown in FIG. 13 wherein the third block (3) is changed from, for example, the block immediately following the second block to the next block thereafter.

To explain, the third block is considered not proper in the case where the LSB of the DC differential of the second block is converted from "1" to "0", i.e., decremented, when it is already at an extreme value because an extreme value cannot be incremented to a greater value. For example, when the DC differential represented by the three bits shown in FIG. 6 is equal to the extreme value "111" it is not possible to increment this extreme value by "1" to negate the decrement of the second block's LSB. In inquiry S21, the mathematical expressions $2^{(DC\ Size)}-1$ and $2^{(DC\ Size-1)}-1$ equate to the maximum positive and negative values, i.e., the extreme values of the DC differential, wherein the DC size is the number of bits in the DC differential. In the example of FIG. 6, the maximum positive value for three bits is $2^{(3)}-1=7$ ("111", value 7) and the maximum negative value is $2^{(3-1)}-1=3$ ("011", value −4). Thus, inquiry S21 determines whether the value in register_3 is at the extreme values of "111" or "011" and, if so, deems the current block inappropriate.

Similarly, inquiry S23 equates the minimum positive and negative values allowable when decrementing the third block to negate a change of the LSB of the second block from "0" to "1", i.e., an increment. In this case, the minimum positive allowable value is $2^{(3-1)}=4$ ("100" binary) since decrementing this value to "011" would result in −4 and not three. The other minimum value is zero since it is not possible to decrement "000". Thus, in inquiry S23 the third block is deemed inappropriate when it contains the minimum values and is to be decremented.

In the situation where the third block is deemed appropriate in inquiry S21, the detection circuit proceeds to step S22 where the value of the third block in register_3 is incremented to negate the anomaly caused by decrementing the second block. Similarly, where the third block is deemed appropriate in inquiry S23, the detection circuit proceeds to step S24 where the value of the third block in register_3 is decremented to negate the anomaly caused by incrementing the second block. Next, the detection circuit sends the correction value in register_3 to the correction circuit 36 which overwrites the DC differential of the third block with the correction value in step S25.

It will be appreciated that the present invention may dispense with the third block and operate without correction data. In that instance, however, the anomaly caused by the insertion of the key data bit into the LSB of the DC differential of the second block will cause a distortion in the moving picture upon decoding. This distortion is minimal because the anomaly changes the DC component by only one and is hardly noticeable in the brief display of that single frame. The anomaly may further be minimized, as explained, by increasing the number of bits in each DCT block to decrease the representative value of each bit as explained.

At step S26, computation circuit 32 determines whether more I-pictures shall be encoded with key data by returning to the start, or ending the key data encoding process. In FIG. 7, for example, the key data may be a string of bits, each bit selected from a different first block. In this situation, the computation circuit will continue to process the bit stream a number of times (n) until all of the key data bits in FIG. 7 are encoded into second blocks. With this arrangement, it is possible to encode key data in multiple portions of the moving picture, thereby impeding greatly the illegal copying of the moving picture.

The recording apparatus 37 (FIG. 9), then, records the bit stream with the encoded key data to a disk. Since the key data indicates that the corresponding moving picture is a copy from a master disk, an illegal copier cannot copy the moving picture from this illegal master without extreme difficulty. The manufacturer may employ a stamper that physically stamps other disks to mass produce stamped copies from the copy encoded with key data. Since each stamped disk carries the encoded key data, each stamped copy is also uncopyable.

Figure 14:
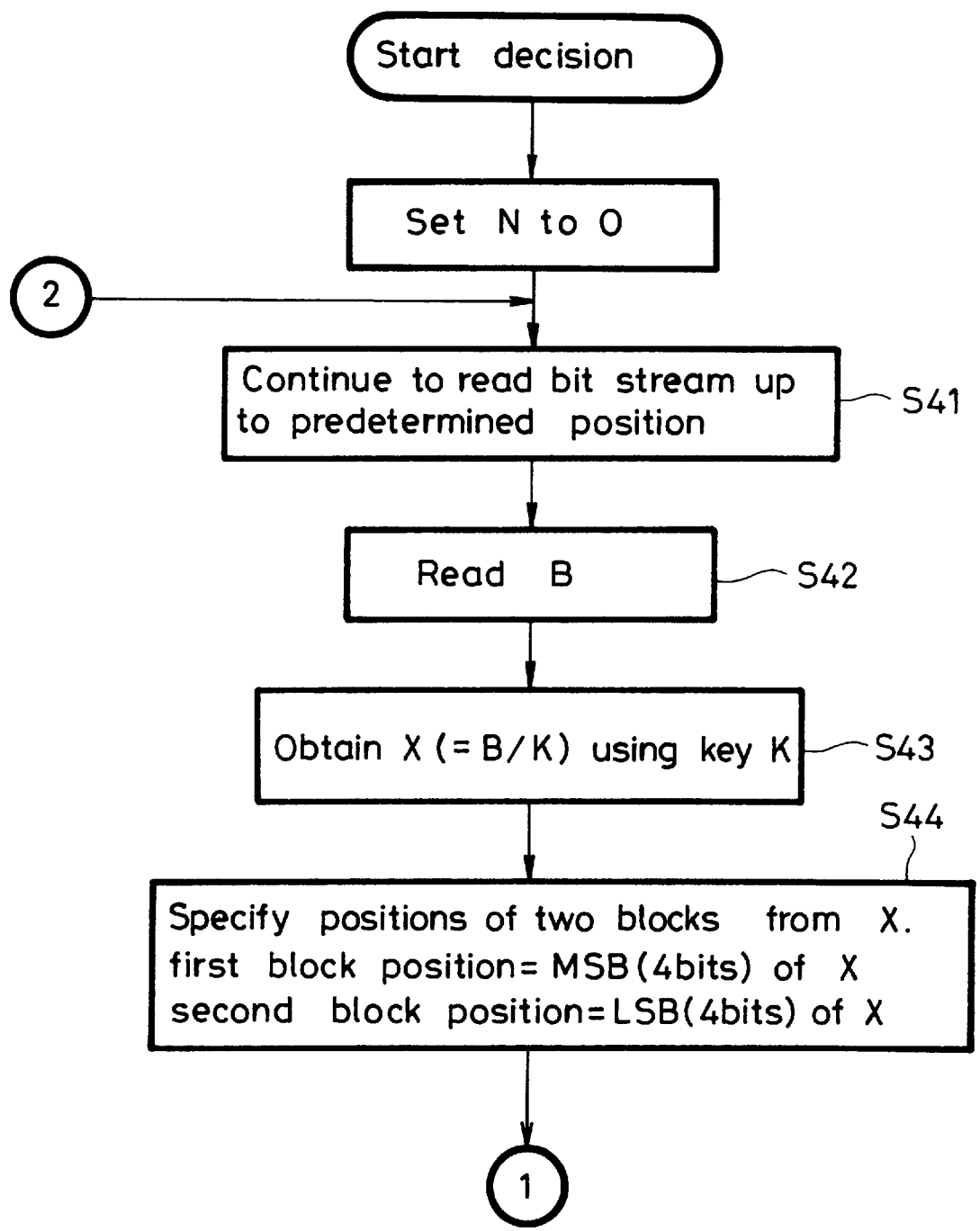
FIG. 14 is a flow chart for explaining the decision circuit operation shown in FIG. 9.
Figure 15:
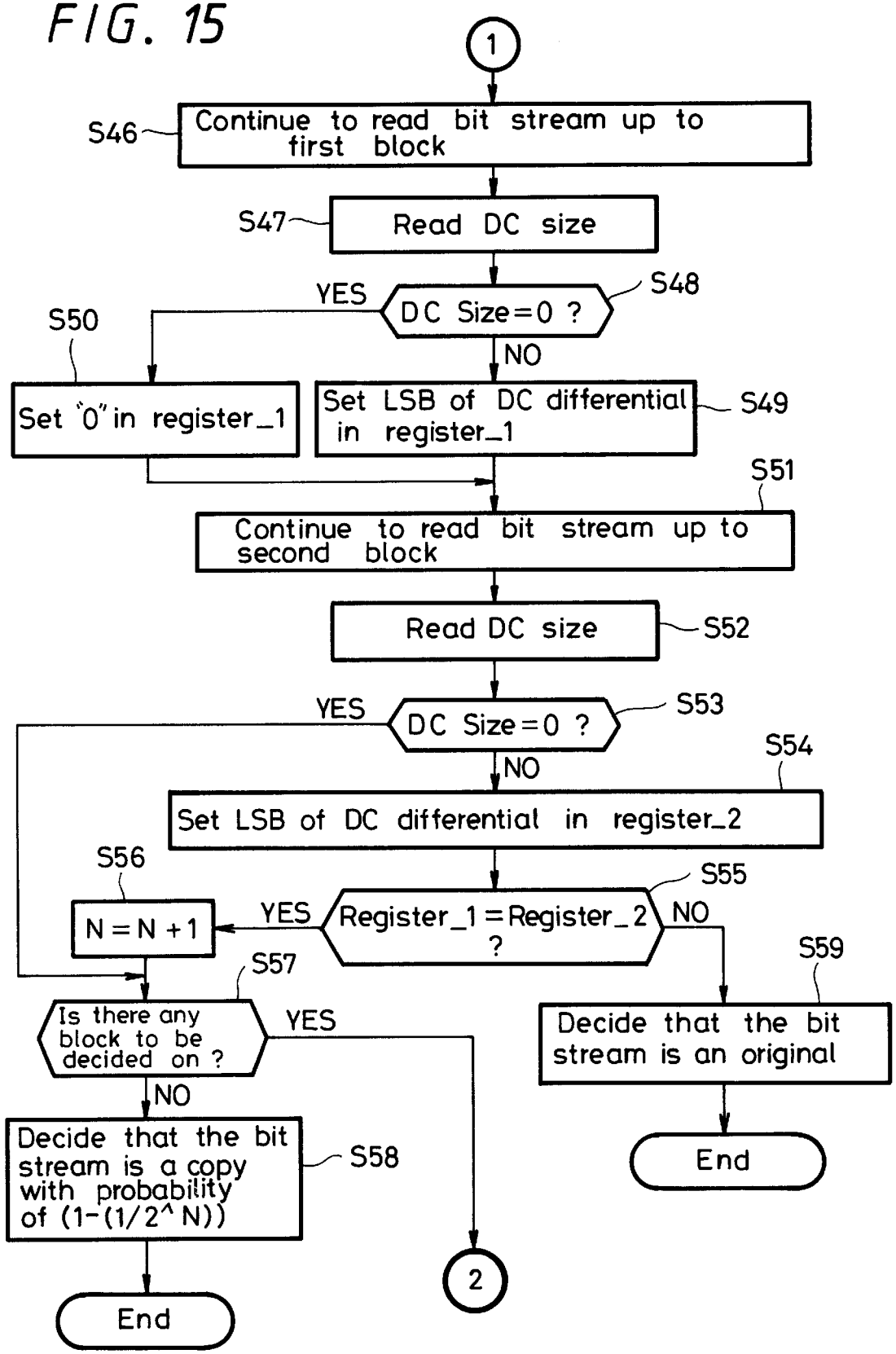
FIG. 15 is a flow chart continued from FIG. 14.

The decision process by which the formatter decides whether the encoded bit stream is reproduced from a legal master disk and is, therefore, copyable is described with reference to the flow charts of FIGS. 14 and 15. In Step S40, the control circuit 39 sets a counter variable (N) which represents the Nth key data bit checked in the string of (n) key data bits in FIG. 7. Steps S41 to S44 are the same as steps S1 to S4 (FIG. 10) and a detailed description of those steps is referred to the corresponding sections. Thus, the position (X) (step S43) of the first block is derived from the value (B) extracted (step S42) from the continuously read bit stream (step S41) and detection circuit 33 (FIG. 9) specifies which portion of the byte (X) is allocated for the first block position and second block position (step S44).

The detection circuit continuously reads the bit stream until the first block is detected in step S46 (FIG. 15) and, then, determines the value of the DC component (DC size) of the first block in step S47. When the detection circuit determines that the DC size is "1" in inquiry S48, the detection circuit proceeds to step S49 and sets register_1 to the LSB of the DC differential. On the other hand, when the DC value is "0", the detection circuit proceeds to step S50 and sets register_1 to "0".

The detection circuit, then, continues in step S52 to continually read the bit stream until the second block is detected. At this time, the detection circuit determines whether or not the DC size of the second block is zero in inquiry S53. If DC size is zero, the operation of formatter proceeds to step S54; if the DC value is not zero, the operation of formatter proceeds to step S57. The detection circuit, in step S54, sets register_2 to the LSB of the DC differential of the second block, and the decision circuit 38 (FIG. 9), in step S55, determines whether the LSBs of the DC differential of the first and second blocks are equal indicating that the Nth key data bit is found and the bit stream is reproduced from an illegal master disk or a disk offered for sale, not a legal master disk. If no key data bits are found, that is, the LSBs of DC differential of the first and second blocks are not equal, the bit stream is deemed reproduced from a master disk in step S59 and copying is allowed.

If an illegal master disk or a disk offered for sale is indicated, that is, the LSBs of the DC differential of the first and second blocks are equal, the control circuit proceeds to step S56 and increments the counter N so that the formatter will search for the next key data bit in the string of FIG. 7. Then, the control circuit proceeds to step S57 and if there are any more key data bits to find from the string of key data bits, the controller returns to step S41 of the flow chart in FIG. 15 to locate the next key data bit in the string. Otherwise, all of the key data bits were located and the control unit prevents the recording apparatus from recording the bit stream since the bit stream is reproduced from an illegal master disk or a disk offered for sale.

It will be appreciated that it is not known whether any given disk includes key data. In the preferred embodiment, the presence of key data is definitely known because its position is indicated in the headers of I-pictures. Alternatively, the position data may be purposely left ambiguous in order to prevent illegal copiers from finding the key data from the header information. In this latter situation, the key data is found by testing the first and second blocks for corresponding I-pictures. It will be appreciated that it is not exactly known whether any given disk is encoded with key data since the LSBs in the first and second block positions may be the same by coincidence. In this situation, the controller must decide in step S58 whether it is probable that the given disk is an illegal master disk or a disk offered for sale based on the number of matches detected between first and second blocks. When all of the key data bits are matched, the probability of the given disk being an illegal master disk or a disk offered for sale increases with the number (N) of matching key data bits and is equal to $(1-(\frac{1}{2}^N))$. It will be appreciated that the probability can be increased to within one thousandth of 100 percent with as little as 10 key data bits.

The present invention does not, in any way, impede lawful digital disk player from playing copies of the master disk. FIG. 16 is a block diagram representing a portion of a player for playing the bit stream reproduced from a disk offered for sale. The reproduced bit stream is decoded by a variable length decoding circuit (VLD) 61 into quantized coefficients and de-quantized into DCT coefficients by inverse quantization circuit 62. The DCT coefficients are transformed into pixels representing a portion of a frame of the moving picture, and these pixels are added to the motion prediction image stored in a prediction memory 66 to re-create the full frame. The full frame is motion compensated by a motion compensation circuit 65 and stored in the prediction memory 66 as the motion prediction image to be employed for the next frame. In this manner, the bit stream is decoded and reconstructed into frames of the moving picture to be output as video data to a monitor, and the like, for display.

While the present invention has been described as inserting key data bits into the luminance (Y) DC component blocks, it is equally practicable to insert the key data into the color difference (Cb, Cr) blocks. For that matter, the key data can be determined from one type of block, luminance (Y) block for example, and inserted into another type of block, such as the color difference (Cr, Cb) blocks.

The present invention may also be embodied as a computer-readable medium for directing a computer, such as the described formatter, to prevent illegal copying. A reproduced bit stream recorded on the computer-readable medium is encoded according to an MPEG standard which provides that the recorded data be encoded as pictures including intra and inter-pictures. The pictures are divided into DCT blocks of DCT coefficients, with DCT blocks having a difference between DC components in adjacent DCT blocks. A first DCT block inma respective intra-picture determines the key data and a second DCT block in the respective intra-picture receives the key data indicating that the computer-readable-medium is a copy. A third DCT block in the respective intra-picture includes data correcting the anomaly caused during recording caused by the receipt of the key data by the second block.

The DC differential from which the key data in the present invention is determined have been described as being fixed length coded blocks. Instead, motion_residual (FLC) encoded from the differential value of the motion vector may be used with equal effect. According to the MPEG scheme, as explained with reference to FIG. 8, the motion vectors of the P-picture and the B-picture are detected by the motion vector detection circuit 11, and these motion vectors are encoded and contained in a bit stream for transmission. These motion vectors are represented by motion_code as VLC as shown in FIG. 18, and by motion_residual as a fixed length code (FLC). Motion_code represents an approximate value of the motion vector, motion residual represents a correction value for indicating an accurate value, and f_code represents the accuracy (magnification) of motion_code.

In the case where f_code is 1, for example, motion_code represents a value with an accuracy of 0.5. A sufficiently accurate value can thus be represented, and therefore motion residual is not used in this case. In the case where f_code is 2, on the other hand, motion_code represents a value with an integer accuracy, and motion_residual a value with an accuracy of 0.5. In other words, motion_residual is represented by a 1-bit FLC indicating 0 or 0.5. Further, in the case where f_code is 3, motion_code represents a value with an accuracy of a multiple of two, and motion_residual provides a 2-bit FLC representing 0, 0.5, 1.0 or 1.5. It will be appreciated that, as in the case of DC differential, motion_residual is not existent for motion_code of 0. In this manner, key data for illegal copy prevention can be recorded in motion_residual data constituting a fixed length code (FLC) as in the case of DC differential mentioned above.

It will be appreciated that the motion_residual data is included in both the P-picture and the B-picture. The exclusive use of motion_residual of the B-picture, however, can prevent the effect of key data insertion on other pictures since the B picture is not used for prediction of other pictures.

Figure 17:
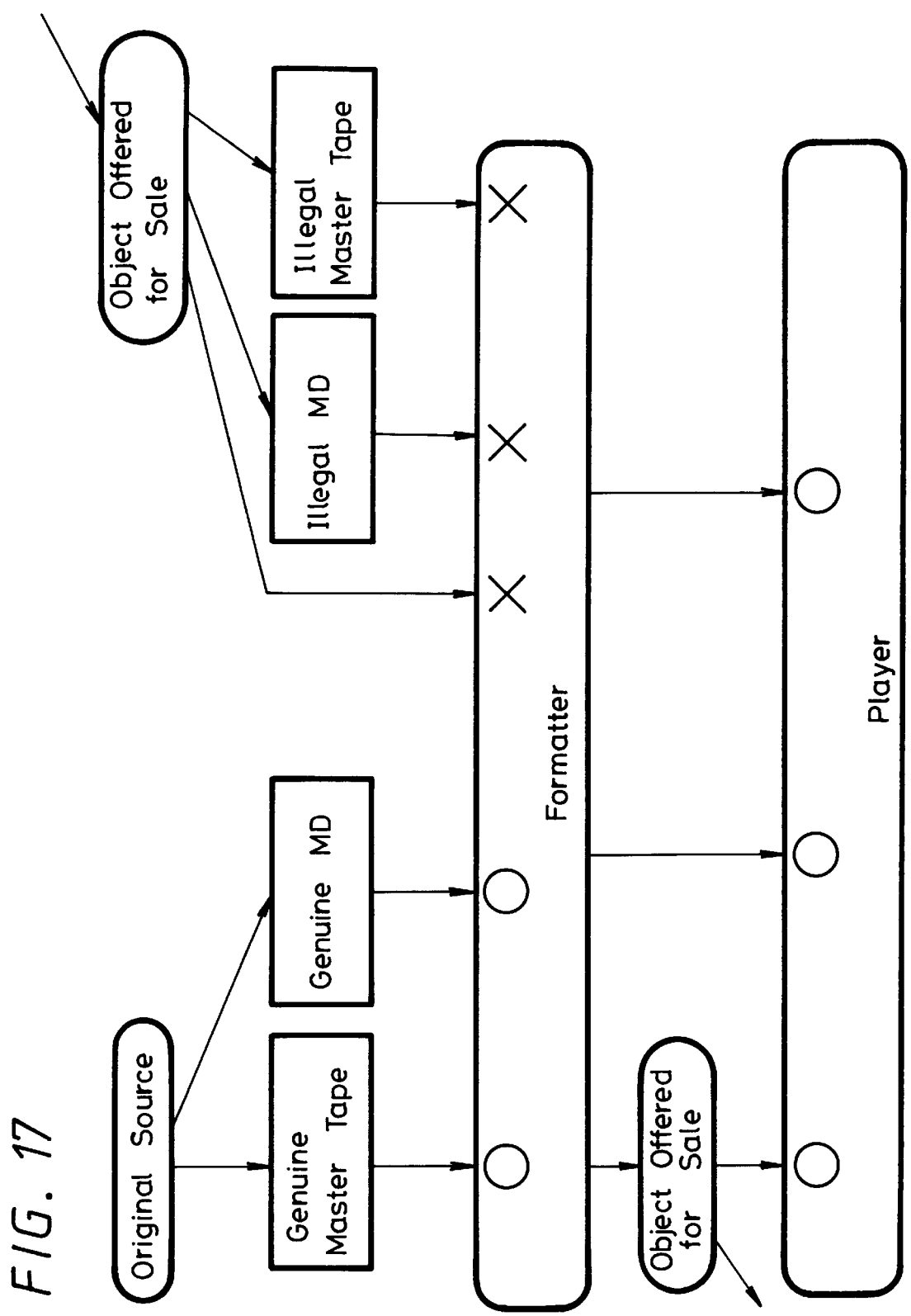
FIG. 17 is a schematic diagram for explaining the prevention of illegal copying with the present invention.

The present invention is particularly suited for manufacturers who wish to protect their digital video programs from illegal copying. As shown in FIG. 17, for example, a manufacturer copies en masse a moving picture from an original source, such as a genuine master disk or master tape. Since the original source does not include key data, the formatter does not detect any key data and allows the moving picture to be recorded to an object offered for sale, such as a disk copy as shown by the circles labelled on the block designated as the formatter. To prevent illegal copying, the formatter detects key data from first blocks already existing in the moving picture and inserts this key data into corresponding second blocks. As explained, the object offered for sale may be lawfully played by the player of FIG. 16, but may not be copied by the formatter. Thus, an illegal copier cannot make copies from the object offered for sale or an illegal master disk because the formatter will detect the key data indicating a copy as shown by the "X" labelled on the formatter. In addition, an illegal copier cannot make an illegal master disk or master tape from the object offered for sale or the illegal master disk because the resulting masters will also include the key data which prevents copying. Accordingly, the present invention assuredly prevents illegal copying of a digital video program, thereby greatly curbing the danger of illegally mass produced copies.

Although the present invention has been described in particular detail to the preferred embodiments, it is to be noted that the invention is not limited thereby, and that various changes and modifications may be affected therein by one skilled in the art without departing from the scope of the invention which is intended to be defined by the appended claims.

We claim:

1. A data recording apparatus for preventing unauthorized copying of data comprising a plurality of data blocks formed as a bit stream subsequently reproduced from a record medium, said apparatus comprising:

designating means for designating a first data block and a second data block from said bit stream;

extracting means for extracting at least a portion of data included in said first data block; and inserting means for inserting said at least a portion of data included in said first data block as key data into said second data block indicating whether said data is copy protected.

2. The apparatus according to claim 1, further comprising recording means for recording the encoded data including said key data to said record medium.

3. The apparatus according to claim 2, wherein said bit stream includes data representing orthogonal transform coefficients comprised of variable and fixed length code data.

4. The apparatus according claim 1, wherein said recorded data is video data encoded as intracoded and interceded pictures formed of blocks said blocks having data representing a motion vector; wherein said first and second blocks designated by said designating means are first and second blocks in an interceded picture; wherein at least a portion of said data representing said motion vector is fixed length data in which said key data is inserted.

5. The apparatus according to claim 1, wherein said inserting means inserts said at least a portion of data included in said first data block as key data into at least a portion of data represented as fixed length data included in said second data block.

6. The apparatus according to claim 1, wherein said recorded data is video data encoded as intracoded and interceded pictures formed of blocks of DCT coefficients, at least one of said blocks having a DC differential component representing a difference between DCT coefficients in said blocks;

wherein said first data block designated by said designating means is a first block of DCT coefficients in an intracoded picture; and wherein said second data block designated by said designating means is a second block of DCT coefficients in the same intracoded picture.

7. The apparatus according to claim 1, wherein a DC differential represents a difference between DCT coefficients in said blocks; wherein said inserting means inserts said key data into said second data block by writing a least significant bit of a first DC differential component in said first block as a least significant bit of a second DC differential component in said second block.

8. The apparatus according to claim 1, wherein said designating means further designates a third data block in said bit stream; and said apparatus further comprises correcting means for correcting an anomaly during recording caused by the insertion of said key data into said second data block.

9. The apparatus according to claim 1, wherein said recorded data is video data encoded as intracoded and interceded pictures formed of blocks of DCT coefficients, at least one of said data blocks having a DC differential component representing a difference between DC DCT coefficients in adjacent blocks;
wherein said first data block designated by said designating means-is a first block of DCT coefficients in an intracoded picture;
wherein said second data block designated by said designating means is a second block of DCT coefficients in the same intracoded picture; and
wherein said designating means designates a third block of DCT coefficients in said same intracoded picture.

10. The apparatus according to claim 1, wherein a DC differential represents a difference between DCT coefficients in said blocks; wherein said inserting means inserts said key data into said second data block by writing a least significant bit of a first DC differential component in said first data block as the least significant bit of a second DC differential component in said second data block; and further comprising correcting means for correcting an anomaly during recording caused by the insertion of said key data into said second data block, said correcting means corrects said anomaly by inserting the least significant bit of said second DC differential component into the least significant bit of a third DC differential component included in a third data block, thereby negating said anomaly caused by insertion of said key data into said second data block.

11. The apparatus according to claim 1, wherein said recorded data is video data encoded as intracoded and interceded pictures formed of blocks of DCT coefficients, at least one of said blocks having a DC differential component representing a difference between DCT coefficients in said blocks; wherein said blocks of DCT coefficients are grouped into macro blocks encoded in a predetermined order and said second data block is a last block in said predetermined order.

12. The apparatus according to claim 1, wherein said bit stream is a MPEG encoded bit stream formed of predictively encoded pictures including B-picture data, and said designating means designates at least a portion of data representing a motion vector of said first and second data blocks of a B-picture.

13. The apparatus according to claim 1, wherein said second data block forms part of an intracoded picture; wherein said inserting means inserts said key data into said second data block in said bit stream of said intracoded picture.

14. The apparatus according to claim 1, wherein said second data block includes a DC DCT differential component representing a difference between DC DCT components in said data blocks; wherein said inserting means inserts said key data into said DC DCT differential component of said second data block.

15. The apparatus according to claim 14, wherein said inserting means inserts said key data into said bit stream as a least significant bit of said DC DCT differential component of said second data block.

16. The apparatus according to claim 1, wherein said data blocks represent a motion vector formed in accordance with motion compensation; wherein said inserting means inserts said key data into a motion residual portion of said motion vector.

17. The apparatus according to claim 1, wherein said designating means designates a plurality of first data blocks and a plurality of respective second data blocks; wherein said inserting means inserts into said bit stream at least a portion of data included in said plurality first data blocks as key data into said respective plurality of second data blocks indicating that the recorded data on said record medium is a copy and should not be copied.

18. The apparatus according to claim 1, further comprising formatting means for formatting said encoded data in a recording format for recording on said record medium.

19. A data recording apparatus for preventing unauthorized copying of encoded data subsequently reproduced as a bit stream from a record medium, said apparatus comprising:
designating means for designating a first data block and a second data block from said bit stream;
inserting means for inserting at least a portion of data included in said first data block as key data into said second data block indicating that the recorded data on said record medium is a copy and should not be copied;
wherein said recorded data is video data encoded as intracoded and interceded pictures formed of blocks of DCT coefficients, at least one of said blocks having a DC differential component representing a difference between DC DCT coefficients in adjacent blocks;
wherein said first data block designated by said designating means is a first block of DCT coefficients in an intracoded picture; and
wherein said second data block designated by said designating means is a second block of DCT coefficients in the same intracoded picture.

20. The apparatus according to claim 19, wherein said inserting means inserts said key data into said second data block by writing a least significant bit of a first DC differential component in said first block as a least significant bit of a second DC differential component in said second block.

21. The apparatus according to claim 19, wherein said blocks of DCT coefficients are grouped into macro blocks encoded in a predetermined order and said second data block is a last block in said predetermined order.

22. A data recording apparatus for preventing unauthorized copying of encoded data subsequently reproduced as a bit stream from a record medium, said apparatus comprising:
designating means for designating a first data block and a second data block from said bit stream;
inserting means for inserting at least a portion of data included in said first data block as key data into said second data block indicating that the recorded data on said record medium is a copy and should not be copied;
wherein said designating means further designates a third data block in said bit stream; and
correcting means for correcting an anomaly during recording caused by the insertion of said key data into said second data-block.

23. The apparatus according to claim 22, wherein said recorded data is video data encoded as intracoded and interceded pictures formed of blocks of DCT coefficients, at least one of said blocks having a DC differential component representing a difference between DC DCT coefficients in adjacent blocks;

wherein said first data block designated by said designating means is a first block of DCT coefficients in an intracoded picture;

wherein said second data block designated by said designating means is a second block of DCT coefficients in the same intracoded picture; and said third data block designated by said designating means is a third block of DCT coefficients in said same intracoded picture.

24. The apparatus according to claim 23, wherein said inserting means inserts said key data into said second data block by writing a least significant bit of a first DC differential component in said first data block as the least significant bit of a second DC differential component in said second data block; and said correcting means corrects said anomaly by inserting the least significant bit of said second DC differential component into the least significant bit of a third DC differential component included in said third data block, thereby negating said anomaly caused by insertion of said key data into said second data block.

25. A data recording apparatus for preventing unauthorized copying of encoded data subsequently reproduced as a bit stream from a record medium, said apparatus comprising:

designating means for designating a first data block and a second data block from said bit stream;

inserting means for inserting at least a portion of data included in said first data block as key data into said second data block indicating that the recorded data on said record medium is a copy and should not be copied;

wherein said recorded data is video data and said bit stream is an MPEG encoded bit stream including for said first data block and said second data block a fixed length code representing a motion vector; and wherein said MPEG encoded bit stream is formed of predictively encoded picture frames including B-picture frames, and said designating means further designates at least a portion of data representing the motion vector of each first and second data block of a B-picture frame.

26. A data recording method for preventing unauthorized copying of data comprised of a plurality of data blocks formed as a bit stream subsequently reproduced from a record medium, said method comprising the steps of:

designating a first data block and a second data block from said bit stream;

extracting at least a portion of data included in said first data block; and inserting said at least a portion of data included in said first data block as key data into said second data block indicating whether said data is copy protected.

27. The method according to claim 26, further comprising the step of recording the encoded data including said key data to said record medium.

28. The method according to claim 27, wherein said bit stream includes data representing orthogonal transform coefficients comprised of variable and fixed length code data.

29. The method according claim 26, wherein said recorded data is video data encoded as intracoded and interceded pictures formed of blocks said blocks having data representing a motion vector; wherein said first and second blocks designated are first and second blocks in an interceded picture; wherein at least a portion of said data representing said motion vector is fixed length data in which said key data is inserted.

30. The method according to claim 26, wherein said step of inserting inserts at least a portion of data included in said first data block as key data into at least a portion of data represented as fixed length data included in said second data block.

31. The method according to claim 26, wherein said recorded data is video data encoded as intracoded and interceded pictures formed of blocks of DCT coefficients, at least one of said blocks having a DC differential component representing a difference between DC DCT coefficients in adjacent blocks;

wherein said step of designating designates a first data block of DCT coefficients in an intracoded picture; and wherein said step of designating designates a second data block of DCT coefficients in the same intracoded picture.

32. The method according to claim 26, wherein said step of designating further designates a third data block in said bit stream, said method further comprising the step of correcting an anomaly during recording caused by the insertion of said key data into said second data block.

33. The method according to claim 26, wherein said recorded data is video data encoded as intracoded and interceded pictures formed of blocks of DCT coefficients, at least one of said blocks having a DC differential component representing a difference between DCT coefficients in said blocks;

wherein said step of designating designates a first data block of DCT coefficients as said first data block of an intracoded picture;

wherein said step of designating designates a second data block of DCT coefficients in the same intracoded picture; and wherein said step of designating designates a third data block of DCT coefficients in the same intracoded picture as a third data block in which said key data is inserted.

34. The method according to claim 26, wherein said recorded data is video data encoded as intracoded and interceded pictures formed of blocks of DCT coefficients, at least one of said blocks having a DC differential component representing a difference between DCT coefficients in said blocks; wherein said step of inserting inserts said key data into said second data block by writing a least significant bit of a first DC differential component in said first data block as a least significant bit of a second DC differential component in said second data block; and correcting an anomaly during recording caused by the insertion of said key data into said second data block by inserting the least significant bit of said second DC differential component into the least significant bit of a third DC differential component included in a third data block, thereby negating said anomaly caused by insertion of said key data into said second data block.

35. The method according to claim 26, wherein said recorded data is video data encoded as intracoded and interceded pictures formed of blocks of DCT coefficients; wherein said blocks of DCT coefficients are grouped into macro blocks encoded in a predetermined order and said second data block is the last block in said predetermined order.

36. The method according to claim 26, wherein said second data block forms part of an intracoded picture; wherein said step of inserting inserts said key data into said second data block in said bit stream of said intracoded picture.

37. The method according to claim 26, wherein said second data block includes a DC DCT differential component representing a difference between DC DCT components in said data blocks; wherein said step of inserting inserts said key data into said bit stream as said DC DCT differential component of said second data block.

38. The method according to claim 37, wherein said inserting means inserts said key data into said bit stream as a least significant bit of said DC DCT differential component of said second data block.

39. The method according to claim 26, wherein said data blocks represent a motion vector formed in accordance with motion compensation; wherein said step of inserting inserts said key data into a motion residual portion of said motion vector.

40. The method according to claim 26, wherein said step of designating designates a plurality of first data blocks and a plurality of respective second data blocks; wherein said step of inserting inserts into said bit stream at least a portion of data included in said plurality of first data blocks as key data into said respective plurality of second data blocks indicating that the recorded data on said record medium is a copy and should not be copied.

41. The method according to claim 26, further comprising the step of formatting encoded data in a recording format for recording on said record medium.

42. A data recording method for preventing unauthorized copying of data subsequently reproduced as a bit stream from a record medium, said apparatus comprising the steps of:

designating a first data block and a second data block from said bit stream;

inserting at least a portion of data included in said first data block as key data into said second data block indicating that the recorded data on said record medium is a copy and should not be copied;

recording the encoded data including said key data to said record medium;

wherein said bit stream includes data representing orthogonal transform coefficients;

wherein said recorded data is video data encoded as intracoded and interceded pictures formed of blocks of DCT coefficients, at least one of said blocks having a DC differential component representing a difference between DC DCT coefficients in adjacent blocks;

wherein said step of designating designates a first data block of DCT coefficients in an intracoded picture; and wherein said step of designating designates a second data block of DCT coefficients in the same intracoded picture.

43. The method according to claim 42, wherein said step of inserting inserts said key data into said second data block by writing a least significant bit of a first DC differential component in said first block as a least significant bit of a second DC differential component in said second block.

44. The method according to claim 42, wherein said blocks of DCT coefficients are grouped into macro blocks encoded in a predetermined order and said designated second data block is the last block in said predetermined order.

45. A data recording method for preventing unauthorized copying of data subsequently reproduced as a bit stream from a record medium, said apparatus comprising the steps of:

designating a first data block and a second data block from said bit stream;

inserting at least a portion of data included in said first data block as key data into said second data block indicating that the recorded data on said record medium is a copy and should not be copied;

recording the encoded data including said key data to said record medium;

transforming said bit stream into orthogonal transform coefficients before encoding; and wherein said step of designating further designates a third data block in said bit stream, said method further comprising the step of correcting an anomaly during recording caused by the insertion of said key data into said second data block.

46. The method according to claim 45, wherein said recorded data is video data encoded as intracoded and interceded pictures formed of blocks of DCT coefficients, at least one of said blocks having a DC differential component representing a difference between DC DCT coefficients in adjacent DCT blocks;

wherein said step of designating designates a first data block of DCT coefficients as an intracoded picture;

wherein said step of designating designates a second data block of DCT coefficients in the same intracoded picture; and wherein said step of designating designates a third data block of DCT coefficients in the same intracoded picture.

47. The method according to claim 46, wherein said step of inserting inserts said key data into said second data block by writing a least significant bit of a first DC differential component in said first data block as a least significant bit of a second DC differential component in said second data block; and said step of correcting corrects said anomaly by inserting the least significant bit of said second DC differential component into the least significant bit of a third DC differential component included in said third data block, thereby negating said anomaly caused by insertion of said key data into said second data block.

48. A data recording method for preventing unauthorized copying of data subsequently reproduced as a bit stream from a record medium, said method comprising the steps of:

designating a first data block and a second data block from said bit stream;

inserting at least a portion of data included in said first data block as key data into said second data block indicating that the recorded data on said record medium is a copy and should not be copied; wherein said recorded data is video data and said bit stream is an MPEG encoded bit stream including for said first data block and said second data block a fixed length code representing a motion vector; and encoding the recorded data into an MPEG encoded bit stream representing predictively encoded picture frames including B-picture frames, and said step of designating further designates at least a portion of data representing the motion vector of each first and second data block of a B-picture frame.

49. An apparatus for preventing unauthorized copying of recorded data which is recorded from data blocks encoded and formed as a bit stream comprised of data blocks including a first data block including at least a portion of data which is extracted and inserted after encoding into a second data block, said apparatus comprising:

detecting means for detecting a first data block and a second data block in said bit stream of data reproduced from said recorded data;

extracting means for extracting said at least a portion of data included in said first data block;

comparing means for comparing said at least a portion of data included in said first data block as key data in said first data block with data in said second data block; and controlling means, responsive to said comparing means, for inhibiting copying of the data reproduced from said recorded data according to a result of said comparing means comparing said key data to said data in said second data block.

50. The apparatus according to claim 49, further comprising display means for displaying a result of said comparing means.

51. The apparatus according to claim 49, wherein said at least a portion of data included in said first data block is inserted in said bit stream after encoding as key data into at least a portion of data represented as fixed length data included in said second data block.

52. The apparatus according to claim 49, wherein said recorded data is video data encoded as intracoded and interceded pictures formed of blocks of DCT coefficients, at least one of said blocks having a DC differential component representing a difference between DC DCT coefficients in adjacent blocks;

wherein said first data block detected by said detecting means is a first block of DCT coefficients in an intracoded picture; and wherein said second data block detected by said detecting means is a second block of DCT coefficients in the same intracoded picture.

53. The apparatus according to claim 49, wherein said second data block forms part of an intracoded picture; wherein said key data is inserted into said second data block in said bit stream of said intracoded picture.

54. The apparatus according to claim 49, wherein said second data block includes a DC DCT differential component representing a difference between DC DCT components in said data blocks; wherein said key data is inserted into said bit stream as said DC DCT differential component of said second data block.

55. The apparatus according to claim 54, wherein said key data is inserted into said bit stream as a least significant bit of said DC DCT differential component of said second data block.

56. The apparatus according to claim 49, wherein said data blocks represent a motion vector formed in accordance with motion detection; wherein said key data is inserted into a motion residual portion of said motion vector.

57. The apparatus according to claim 49, wherein said detecting means detects a plurality of first data blocks and a plurality of respective second data blocks; wherein said comparing means compares said key data in said plurality of first data blocks and said respective plurality of second data blocks indicating that the recorded data on said record medium is a copy and should not be copied.

58. The apparatus according claim 49, wherein said recorded data is video data and said bit stream is an MPEG encoded bit stream including a fixed length code representing a motion vector.

59. The apparatus according to claim 58, wherein said MPEG encoded bit stream is formed of predictively encoded picture frames including B-picture frames from which the fixed length code of the motion vector is selected as said key data.

60. An apparatus for preventing unauthorized copying of recorded data comprising:

detecting means for detecting a first data block and a second data block in a bit stream of data reproduced from said recorded data;

comparing means for comparing predetermined data as key data in said first data block with said data in second data block;

controlling means, responsive to said comparing means, for inhibiting copying of the data reproduced from said recorded data;

wherein said recorded data is video data encoded as intracoded and interceded pictures formed of blocks of DCT coefficients, each block having a DC differential component representing a difference between DC DCT coefficients in adjacent blocks;

wherein said first data block detected by said detecting means is a first block of DCT coefficients in an intracoded picture; and wherein said second data block detected by said detecting means is a second block of DCT coefficients in the same intracoded picture.

61. A method for preventing unauthorized copying of recorded data which is recorded from data blocks encoded and formed as a bit stream comprised of data blocks including a first data block including at least a portion of data which is extracted and inserted after encoding into a second data block, said method comprising the steps of:

detecting a first data block and a second data block in said bit stream of data reproduced from said recorded data;

extracting said at least a portion of data included in said first data block;

comparing predetermined data as key data in said first data block with data of said second data block inserted in said bit stream after encoding; and selectively inhibiting copying of the data reproduced from said recorded data based on a comparison of said key data to said data in said second data block.

62. The method according to claim 61, further comprising the step of displaying a result of said comparing.

63. The method according to claim 61, wherein said key data is inserted into at least a portion of data of said bit stream represented as fixed length data included in said second data block.

64. The method according to claim 61, wherein said recorded data is video data encoded as intracoded and interceded pictures formed of blocks of DCT coefficients, each block having a DC differential component representing a difference between DC DCT coefficients in adjacent blocks;

said detected first data block is a first block of DCT coefficients in an intracoded picture; and said detected second data block is a second block of DCT coefficients in the same intracoded picture.

65. The method according to claim 60, wherein said second data block forms part of an intracoded picture; wherein said key data is inserted into said second data block in said bit stream of said intracoded picture.

66. The method according to claim 60, wherein said second data block includes a DC DCT differential component representing a difference between DC DCT components in said data blocks; wherein said key data is inserted into said bit stream as said DC DCT differential component of said second data block.

67. The method according to claim 66, wherein said key data is inserted into said bit stream as a least significant bit of said DC DCT differential component of said second data block.

68. The method according to claim 61, wherein said data blocks represent a motion vector formed in accordance with motion detection; wherein said key data is inserted into a motion residual portion of said motion vector.

69. The method according to claim 61, wherein said step of detecting detects a plurality of first data blocks and a plurality of respective second data blocks; wherein said step of comparing compares key data of said plurality of first data blocks and said respective plurality of second data blocks indicating that the recorded data on said record medium is a copy and should not be copied.

70. The method according to claim 61, wherein said recorded data is video data encoded as intracoded and interceded pictures formed of blocks of DCT coefficients, each block having a DC differential component representing a difference between DC DCT coefficients in adjacent blocks;

wherein said first data block is a first block of DCT coefficients in an intracoded picture; and wherein said second data block is a second block of DCT coefficients in the same intracoded picture.

71. A method for preventing unauthorized copying of recorded data comprising the steps of:

detecting a first data block and a second data block in a bit stream of data reproduced from said recorded data;

comparing predetermined data as key data in said first data block with data of said second data block; and selectively inhibiting copying of the data reproduced from said recorded data if said key data compares to said data in said second data block;

wherein said recorded data is video data encoded as intracoded and interceded pictures formed of blocks of DCT coefficients, each block having a DC differential component representing a difference between DC DCT coefficients in adjacent blocks;

said detected first data block is a first block of DCT coefficients in an intracoded picture; and said detected second data block is a second block of DCT coefficients in the same intracoded picture.

72. A processor-readable medium having recorded thereon information for directing a processor to prevent unauthorized copying of data encoded as a bit stream of intracoded and interceded pictures formed of DCT blocks of DCT coefficients and recorded on said medium, at least one of said DCT blocks having a DC differential component representing a difference between DC components in adjacent DCT blocks, wherein:

predetermined data in a first DCT block in an intracoded picture is key data; and predetermined second data in a second DCT block in the same intracoded picture indicates that said medium is a copy if said predetermined data in said second DCT block is equal to said key data.

73. The medium of claim 72, wherein a third DCT block in said same intracoded picture includes data correcting an anomaly caused if said predetermined data in said second DCT block is equal to said key data.

74. The medium of claim 73, wherein said predetermined data in said second DCT block is a least significant bit of a first DC differential component in said first DCT block and is the least significant bit of a second DC differential component in said second DCT block.

75. The medium according to claim 74, wherein said data included in said third DCT block is set to the least significant bit of said second DC differential component before said key data is inserted into said second block.

76. The medium according to claim 75, wherein said DCT blocks are grouped into macro blocks, said DCT blocks of each macro block encoded in a predetermined order and said second DCT block is a last DCT block in said predetermined order.

77. The processor-readable medium according to claim 72, wherein said key data is inserted into at least a portion of data of said bit stream represented as fixed length data included in said second DCT block on said processor-readable medium.

78. The processor-readable medium according to claim 72, wherein said second DCT block forms part of an intracoded picture; wherein said key data is inserted into said second DCT block in said bit stream of said intracoded picture.

79. The processor-readable medium according to claim 72, wherein said second DCT block includes a DC DCT differential component representing a difference between DC DCT components in said DCT blocks; wherein said key data is inserted into said bit stream as said DC DCT differential component of said second DCT block.

80. The processor-readable medium according to claim 79, wherein said key data is inserted into said bit stream as a least significant bit of said DC DCT differential component of said second DCT block.

81. The processor-readable medium according to claim 72, wherein said DCT blocks represent a motion vector formed in accordance with motion detection; wherein said key data is inserted into a motion residual portion of said motion vector.

82. The processor-readable medium according to claim 72, wherein said processor-readable medium stores a plurality of first DCT blocks and a plurality of respective second DCT blocks; wherein said key data is inserted into said plurality of respective second DCT blocks indicating that the recorded data on said record medium is a copy and should not be copied.

83. The processor-readable medium according to claim 72, wherein said bit stream is formatted on said processor-readable medium in a recording format including said key data inserted in said second DCT block.

84. A processor-readable medium formed in a format for preventing unauthorized copying of data comprised of a plurality of data blocks formed as a bit stream recorded on said processor-readable medium comprising the steps of:

designating a first data block and a second data block from said bit stream;

extracting at least a portion of data included in said first data block; and inserting into said bit stream said at least a portion of data included in said first data block as key data into said second data block indicating whether said data is copy protected.

85. The processor-readable medium according to claim 84, wherein said data blocks represent a motion vector formed in accordance with motion detection; wherein said step of inserting inserts said key data into a motion residual portion of said motion vector.

* * * * *